(No Model.) 2 Sheets—Sheet 1.

J. F. WARD.
APPARATUS FOR LAYING PIPE.

No. 403,865. Patented May 21 1889.

Witnesses:
E. J. Griswold
John Revell

Inventor:
J. F. Ward.
By his Attorneys
Howson and Howson

N. PETERS, Photo-Lithographer, Washington, D. C.

(No Model.) 2 Sheets—Sheet 2.

J. F. WARD.
APPARATUS FOR LAYING PIPE.

No. 403,865. Patented May 21 1889.

WITNESSES:
E. J. Griswold
John Revell.

INVENTOR
John F. Ward.
BY
Howson and Howson
his ATTORNEYS

UNITED STATES PATENT OFFICE.

JOHN F. WARD, OF JERSEY CITY, NEW JERSEY.

APPARATUS FOR LAYING PIPE.

SPECIFICATION forming part of Letters Patent No. 403,865, dated May 21, 1889.

Application filed July 23, 1888. Serial No. 280,718. (No model.)

*To all whom it may concern:*

Be it known that I, JOHN F. WARD, a citizen of the United States, and a resident of Jersey City, New Jersey, have invented an Improved Means for Laying Pipe, of which the following is a specification.

When heavy piping has to be laid under water—as, for instance, where piping for a water-supply has to be carried out from the bank of a river or lake to some distance from the shore and laid under water on the bed of the river or lake—or where piping has to be laid in soft, muddy, or marshy ground the most economical plan of course is to join the sections of piping together above water or other surface and let the joined piping down. If ball-and-socket joints are used, this can be done without any great difficulty—as, for instance, by the method described in the Letters Patent No. 111,498, granted to me January 31, 1871; but where the more economical rigid joints are used for the pipe-sections the laying of the piping is attended with the danger of breaking some of the joints, unless the whole length of the pipe is dropped down to its bed all at one time.

It is the primary object of my present invention to insure in the simplest way the dropping of the whole length of united pipe-sections as one body to the bed of the river or lake or whatever it may be.

Figure 1:
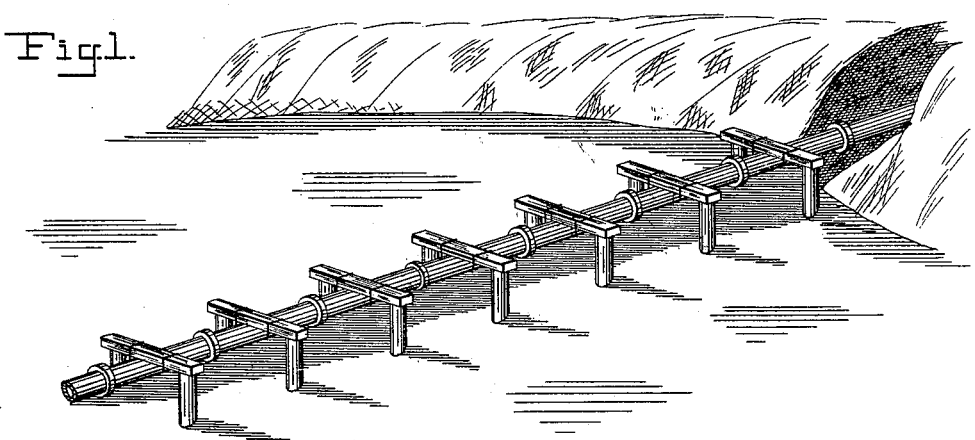
Figure 2:
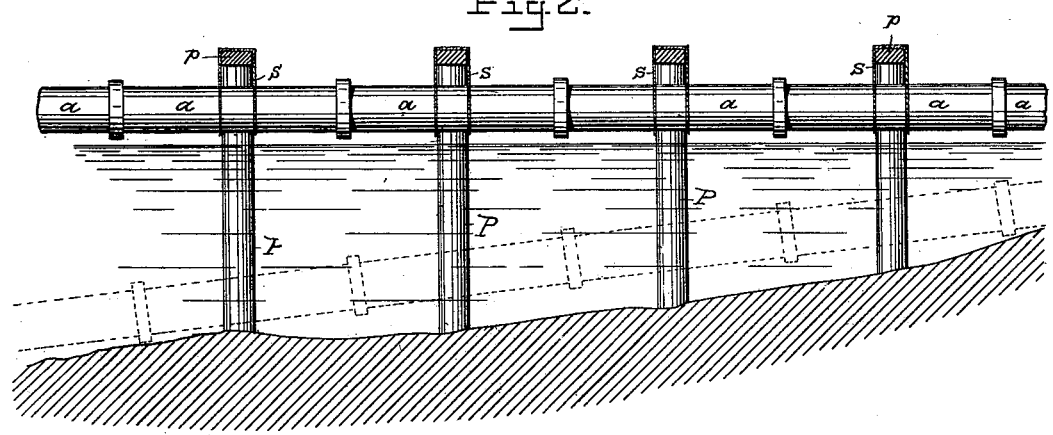
Figure 3:
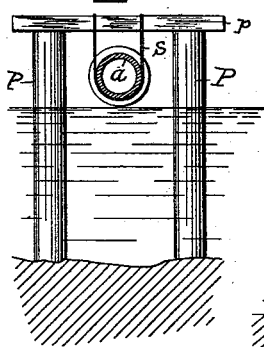
Figure 5:
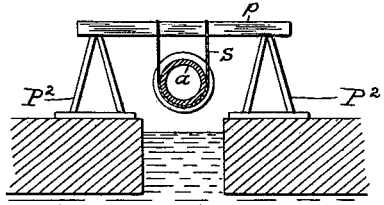
Figure 4:
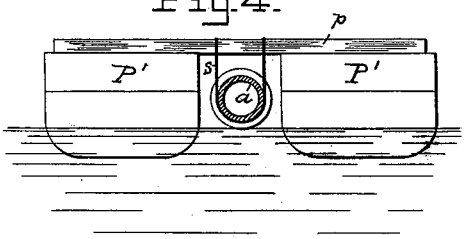
Figure 6:
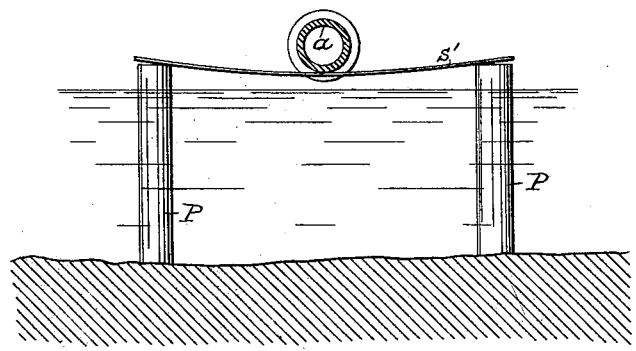
Figure 7:
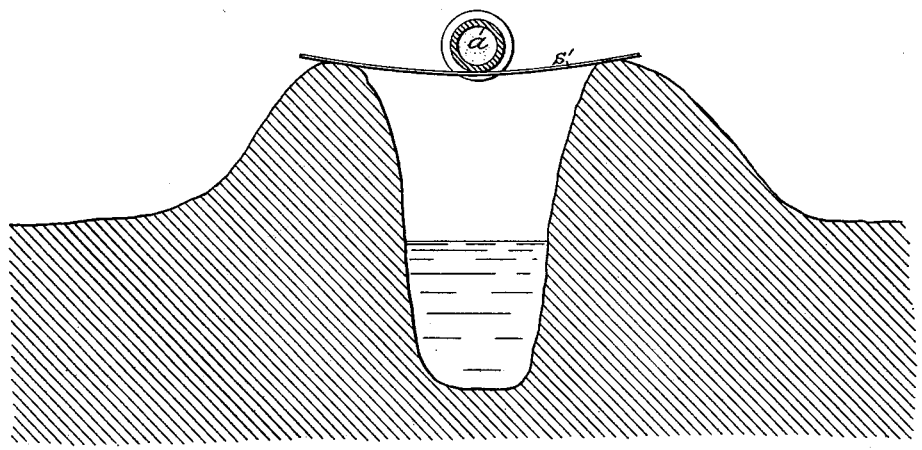

In the accompanying drawings, Figure 1 is a perspective view illustrating the carrying out of my invention. Fig. 2 is a longitudinal vertical section drawn to a larger scale. Fig. 3 is a transverse section of the same. Figs. 4 and 5 are views illustrating modified forms of appliances for carrying out my invention. Figs. 6 and 7 are views of other modifications.

In preparing to lay a length of pipe in accordance with my invention on the bottom of a river or lake and running out from the shore—as, for instance, for a water-supply—I first provide a series of supports for the length of pipe over the top of the water immediately over the line where the piping has to be laid. This line of supports or staging may be in the form of two rows of piles, P, driven into the river or lake in pairs, the successive pairs being preferably at a distance apart equal to the length of a section, $a$, of the piping, as shown in Figs. 1 and 2. A cross-piece, $p$, is then preferably laid on the top of the two piles of each pair, as shown in Fig. 3. If the water is very deep, or for other reasons it is not desirable or available to use piles, I may use boats or pontons or other floating supports, P', as shown in Fig. 4. If it is in the winter and the water is frozen over sufficiently solidly, a long cut may be made in the ice where the piping is to be laid, and stools $P^2$ or other suitable supports be provided with cross-pieces $p$. Then, as each successive section $a$ of piping is connected up, it is supported in a sling, $s$, of cord or other suitable material, which is suspended from the beam $p$ of the staging. Each sling is of a strength sufficient to support a certain length—say one section—of pipe, but not strong enough for two sections. When the successive sections have been joined to make the whole piping of the desired length, and supported over the water by slings, as described, and everything is ready for the lowering of the piping into the water, one of the slings $s$ is freed or removed by cutting or breaking it. This instantly brings an increased weight upon the adjoining slings, which snap immediately, so that in a few moments the whole series of slings have been broken and the whole length of piping sinks in one body to the bottom of the water.

If desired, two or even more of the slings may be cut at the same time; but this is not necessary, and it would be undesirable, as the slings would have to be cut simultaneously.

Instead of employing cords to form the slings to support the pipe-sections, strips $s'$ of wood may be used, with their opposite ends resting on supports, as indicated in Fig. 6; but in such case, of course, each wooden sling $s'$ must be only strong enough to support its own section, so that when one such wooden sling of a series is severed, broken, or removed, or otherwise freed, the others will snap immediately.

Although I have described my invention as especially designed to facilitate the laying of piping under water, it may also be desirable to use it in laying piping in trenches where the ground is marshy or soft and muddy, so that the workmen cannot well work in the trenches after the latter have once been dug. In that case the wooden strips or skids $s'$, to form the slings for the piping, may be supported over the trenches by the mounds of earth thrown up on each side, as shown in Fig. 7.

I claim as my invention—

The herein-described means for laying piping, said means consisting of supports combined with spaced slings each of a strength sufficient to support only its own section, so that on the severing or freeing of one of the slings the extra weight thrown on the other slings will cause them to break and the whole length of piping to drop, all substantially as set forth.

In testimony whereof I have signed my name to this specification in the presence of two subscribing witnesses.

JOHN F. WARD.

Witnesses:
JOHN REVELL,
GEO. A. CRANE.